United States Patent [19]

Cowan, II et al.

[11] Patent Number: 5,285,486
[45] Date of Patent: Feb. 8, 1994

[54] INTERNAL PASSIVE HYDROGEN PEROXIDE DECOMPOSER FOR A BOILING WATER REACTOR

[75] Inventors: Robert L. Cowan, II; Robert J. Law, both of Livermore; James E. Charnley, Gilroy, all of Calif.

[73] Assignee: General Electric Company, San Jose, Calif.

[21] Appl. No.: 982,176

[22] Filed: Nov. 25, 1992

[51] Int. Cl.$^5$ .................................. G21C 19/317
[52] U.S. Cl. ..................... 376/301; 423/579; 423/584
[58] Field of Search ............... 376/301, 300; 423/580, 423/584, 579

[56] References Cited

U.S. PATENT DOCUMENTS

| | | | |
|---|---|---|---|
| 2,721,788 | 10/1955 | Schad | 423/579 |
| 2,863,729 | 12/1958 | McDuffie | 23/204 |
| 2,945,794 | 7/1960 | Winters et al. | 204/154.2 |
| 2,961,391 | 11/1960 | King | 204/193.2 |
| 3,284,305 | 11/1966 | Urey et al. | 376/301 |
| 3,663,725 | 5/1972 | Pearl | 376/306 |
| 3,986,839 | 10/1976 | Queiser et al. | 376/301 |
| 4,014,984 | 3/1977 | Parnes | 376/301 |
| 4,171,350 | 10/1979 | Sanders | 423/580 |
| 4,226,675 | 10/1980 | Lewis et al. | 376/301 |
| 4,246,235 | 1/1981 | Rogers | 376/301 |
| 4,282,062 | 8/1981 | Stiefel et al. | 376/306 |
| 4,374,083 | 2/1983 | Deinlein et al. | 376/306 |
| 4,574,071 | 3/1986 | deSilva et al. | 422/14 |
| 4,752,461 | 6/1988 | Coeckelberghs et al. | 423/579 |
| 4,789,488 | 12/1988 | deSilva | 210/750 |
| 4,842,811 | 6/1989 | Desilva | 376/301 |
| 5,130,081 | 7/1992 | Niedrach | 376/305 |
| 5,135,709 | 8/1992 | Andresen et al. | 376/305 |
| 5,147,602 | 9/1992 | Andresen et al. | 420/35 |
| 5,164,152 | 11/1992 | Kim et al. | 376/305 |

FOREIGN PATENT DOCUMENTS 0467110  6/1991  European Pat. Off. ........ C01B 5/00

OTHER PUBLICATIONS

Cowan et al., "U.S. Experience with Hydrogen Water Chemistry in BWRs", Japan Atomic Ind. Forum Water Chem. Conf., Tokyo (1988).
Cowan et al., "Experience with hydrogen water chemistry etc.", Water Chem. for Nucl. Reactor Systems 4, BNES, London (1986), 29-3.
Ullberg et al., "Hydrogen Peroxide in BWRs", Water Chem. for Nucl. Reactor Systems, 4, BNES, London (1987), pp. 67-73.
Ruiz et al., "Model Calculations of water radiolysis in BWR primary coolant," Water Chem. of Nucl. Reactor Systems 5, BNES, London (1989), pp. 131-140.
BWR Hydrogen Water Chemistry Guidelines: 1987 Revision, EPRI NP-4947-SR, Dec. 1988.
Rao et al., "Protective coatings for radiation control etc.," J. Vac. Sci. Technol. A 5(4), Jul/Aug. 1987, pp. 2701-2705.
Kim et al., "The Application of Noble Metals in Light--Water Reactors", JOM, Apr. 1992, pp. 14-18.
Niedrach, "Effect of Palladium Coatings on the Corrosion Potential of Stainless Steel etc.", Corrosion, vol. 47, No. 3 (1991) pp. 162-169.
Rogers et al., "Catalytic recombiners of BWRs", Nucl. Eng. Int'l, Sep. 1973, pp. 711-715.
Indig et al., "Mitigation of SCC in an operating BWR via $H_2$ injection", Int'l Corrosion Forum, Anaheim, Apr. 1983.
Jones et al., "Controlling SCC in BWR Piping by Water Chemistry Modification", NACE Symposium, Corrosion '84, New Orleans, 1984.

*Primary Examiner*—Daniel D. Wasil
*Attorney, Agent, or Firm*—J. S. Beulick

[57] ABSTRACT

A passive decomposer operating in the water/steam mixture exiting the core of a boiling water reactor. The decomposer comprises a catalytic material arranged and situated such that substantially all of the water/steam mixture entering the water/steam separator device flows over the surface of the catalytic material. The catalytic decomposing surfaces decompose hydrogen peroxide molecules dissolved in the liquid phase to form water and oxygen molecules. The passive catalytic decomposer is constructed to ensure that the pressure drop of the reactor water across the device is very small. The decomposer can include a plurality of stainless steel flow-through housings packed with stainless steel catalytic decomposer material, which could take the form of tangled wire or strips, crimped ribbon, porous sintered metal composite or any other structure having a high surface area-to-volume ratio.

14 Claims, 6 Drawing Sheets

INTERNAL PASSIVE HYDROGEN PEROXIDE DECOMPOSER FOR A BOILING WATER REACTOR

FIELD OF THE INVENTION

This invention relates to reducing the corrosion potential of components exposed to high-temperature water. As used herein, the term "high-temperature water" means water having a temperature of about 150° C. or greater, steam, or the condensate thereof. High-temperature water can be found in a variety of known apparatus, such as water deaerators, nuclear reactors, and in steam-driven central station power generation.

BACKGROUND OF THE INVENTION

Nuclear reactors are used in central-station electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor, and about 15 MPa and 320° C. for a pressurized water reactor. The materials used in both boiling water and pressurized water reactors must withstand various loading, environmental and radiation conditions.

Some of the materials exposed to high-temperature water include carbon steel, alloy steel, stainless steel, nickel-based alloys, and cobalt-based alloys. Despite the careful selection and treatment of these materials for use in water reactors, corrosion occurs on the materials exposed to the high-temperature water. Such corrosion contributes to a variety of problems, e.g., stress corrosion cracking, sticking of pressure relief valves, buildup of the gamma radiation emitting $^{60}Co$ isotope and erosion corrosion.

Stress corrosion cracking is a known phenomenon occurring in reactor components, such as structural members, piping, fasteners, and welds, exposed to high-temperature water. As used herein, the term "stress corrosion cracking" (hereinafter "SCC" means cracking propagated by static or dynamic stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

It is well known that SCC occurs at higher rates when oxygen is present in the reactor water in concentrations of about 5 parts per billion (ppb) or greater. Stress corrosion cracking is further increased in a high radiation flux where oxidizing species, such as oxygen, hydrogen peroxide, and short-lived radicals are produced from radiolytic decomposition of the reactor water. Such oxidizing species increase the electrochemical corrosion potential of metals. Electro-chemical corrosion is caused by a flow of electrons from anodic and cathodic areas on metallic surfaces. The corrosion potential is a measure of the thermodynamic tendency for corrosion phenomena to occur, and is a fundamental parameter in determining rates of, e.g., SCC, corrosion fatigue, corrosion film thickening, and general corrosion.

Stress corrosion cracking in boiling water nuclear reactors and the associated water circulation piping has historically been reduced by injecting hydrogen in the water circulated therein. The injected hydrogen reduces oxidizing species in the water, such as dissolved oxygen, and as a result lowers the corrosion potential of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the corrosion potential below a critical potential required for protection from SCC in high-temperature water. As used herein, the term "critical potential" means a corrosion potential at or below a range of values of about $-230$ to $-300$ mV based on the standard hydrogen electrode (she) scale for the case of pure water. Stress corrosion cracking proceeds at an accelerated rate in systems in which the electrochemical potential is above the critical potential, and at a substantially lower rate in systems in which the electrochemical potential is below the critical potential. Water containing oxidizing species such as oxygen increases the corrosion potential of metals exposed to the water above the critical potential, whereas water with little or no oxidizing species present results in corrosion potentials below the critical potential.

In a boiling water reactor (BWR), the radiolysis of the primary water coolant in the reactor core causes the net decomposition of a small fraction of the water to the chemical products $H_2$, $H_2O_2$ and $O_2$. For steady-state operating conditions, equilibrium concentrations of $O_2$, $H_2O_2$, and $H_2$ are established in both the water which is recirculated and the steam going to the This concentration of $O_2$, $H_2O_2$, and $H_2$ is oxidizing and results in conditions that can promote SCC of susceptible materials of construction. One method employed to mitigate SCC of susceptible material is called hydrogen water chemistry ("HWC"), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water. The rate of these recombination reactions is dependent on local radiation fields, flow rates and other variables.

Figure 2:
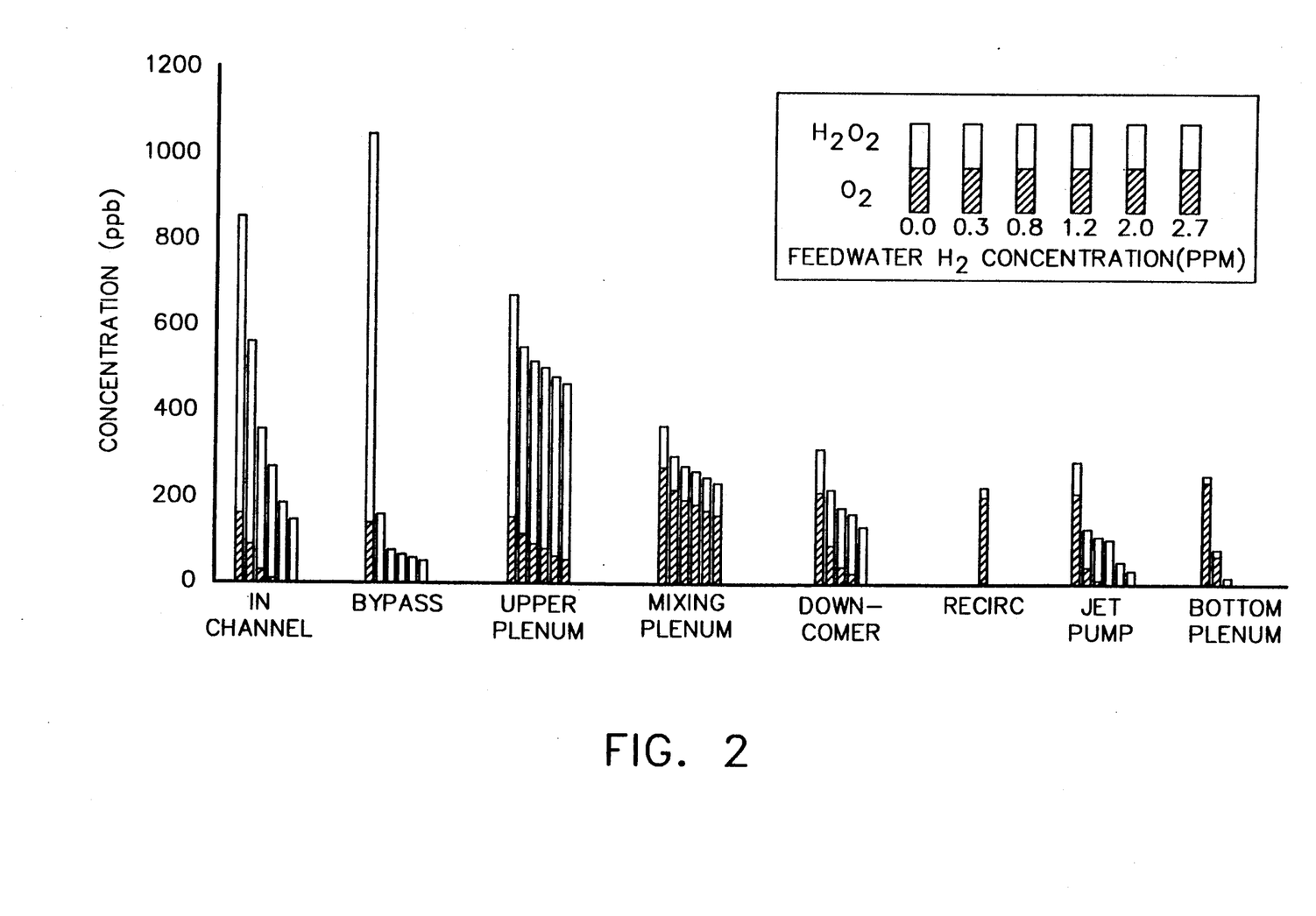
FIG. 2 is a graph showing calculated $O_2$ and $H_2O_2$ concentrations for various locations in a conventional BWR as a function of feedwater hydrogen concentration.

Corrosion potentials of stainless steels in contact with reactor water containing oxidizing species can be reduced below the critical potential by injection of hydrogen into the water in a concentration of about 50 to 100 ppb or greater. For adequate feedwater hydrogen addition rates, the low ($O_2+H_2O_2$) concentration condition necessary to inhibit SCC can be established in certain locations of the reactor. This condition is an electrochemical potential of less than $-0.230$ $V_{she}$. Different locations in the reaction system require different levels of hydrogen addition, as shown in FIG. 2. Much higher hydrogen injection levels are necessary to reduce the corrosion potential within the high radiation flux of the reactor core, or when oxidizing cationic impurities, e.g., cupric ion, are present.

However, feedwater hydrogen additions, e.g., of about 200 ppb or greater, that reduce the corrosion potential below the critical potential, can result in a higher radiation level in the steam-driven turbine section from incorporation of the short-lived $^{16}N$ species. For most BWRs, the amount of hydrogen addition required to provide mitigation of SCC of pressure vessel internal components results in an increase in the main steam line radiation monitor by a factor of greater than about four. This increase in main steam line radiation can cause high, even unacceptable, environmental dose rates that can require expensive investments in shielding and radiation exposure control.

Accordingly, although the addition of hydrogen lowers the corrosion potential of reactor water, it is also desirable to limit the amount of hydrogen in reactor water, while maintaining the corrosion potential below the critical potential.

The primary products of water radiolysis in the core are $H_2$, $H_2O_2$, $OH$, $H$ and the hydrated electron. In irradiated water $O_2$ and $H_2O_2$ are in a state of dynamic equilibrium. During HWC, the computed ratio of $H_2O_2$ to $O_2$ in the downcomer annulus is large. The reason reported by M. Ullberg et al., "Hydrogen Peroxide in BWRs", Water Chemistry for Nuclear Reactor Systems 4, BNES, London, 1987, pp. 67-73, is that the $H_2$ added during HWC initially slows down the oxidation of $H_2O_2$ to $O_2$, speeds up the reduction of $O_2$ to $H_2O_2$ and has little effect on the reduction of $H_2O_2$ to $H_2O$. Thus, hydrogen peroxide is relatively stable in the recirculation water of a BWR.

It is further known from the Ullberg et al. article that $H_2O_2$ in water will decompose on a heterogeneous solid surface at elevated temperatures by the reaction:

$$2H_2O_2 + Surface \rightarrow 2H_2O + O_2$$

This decomposition of $HO_2$ is referred to as heterogeneous decomposition. The rate of decomposition can be increased through the use of decomposition catalysts and will also be dependent on the temperature and the ratio of surface area to volume.

SUMMARY OF THE INVENTION

The present invention improves upon known HWC techniques by allowing the achievement of specified conditions at key locations in the reactor system by addition of relatively lower levels of hydrogen to the feedwater. Thus, the amount of hydrogen required and associated costs will be reduced significantly. In addition, the negative side effect of high main steam line radiation increase can be avoided.

The present invention is a passive hydrogen peroxide decomposer operating in the water/steam mixture exiting the core of a BWR. As used herein, the terms "decomposition catalyst material" and "catalytic decomposer material" will be used interchangeably to mean a solid material which serves as a catalyst for hydrogen peroxide decomposition in a BWR.

The decomposition catalyst material is arranged and situated such that all (except perhaps a small leakage flow) of the water/steam mixture entering the steam/water separator device flows over the surface of the catalytic material. The catalytic surfaces react with the water radiolysis product $H_2O_2$ in the liquid phase to decompose $H_2O_2$ in accordance with (but not limited to) the reaction:

$$2H_2O_2 + Surface \rightarrow 2H_2O + O_2$$

The passive catalytic decomposer of the invention is constructed to ensure that the pressure drop of the reactor water across the device is very small (less than 5 psi). In addition, the catalytic material must be corrosion resistant in pure water under BWR conditions and have structural strength at reactor temperatures. The decomposer includes a stainless steel flow-through housing packed with catalytic decomposer material, which could take the form of tangled wire or strips, crimped ribbon, porous sintered metal composite, a honeycomb structure or any other structure having a high surface area-to-volume ratio. A preferred catalytic decomposer material is stainless steel because of its predictable performance in a BWR environment based on historic use. To increase the rate of hydrogen peroxide decomposition, the surface of the stainless steel substrate can be plated or alloyed with a noble metal, e.g., platinum or palladium. However, other solid materials having structural strength and corrosion resistance suitable for the BWR environment can be used.

BRIEF DESCRIPTION OF THE DRAWINGS

These and other advantages of the invention will be better understood when the detailed description of the preferred embodiments of the invention is read in conjunction with the drawings, wherein.

DETAILED DESCRIPTION OF THE PREFERRED EMBODIMENTS

Figure 1:
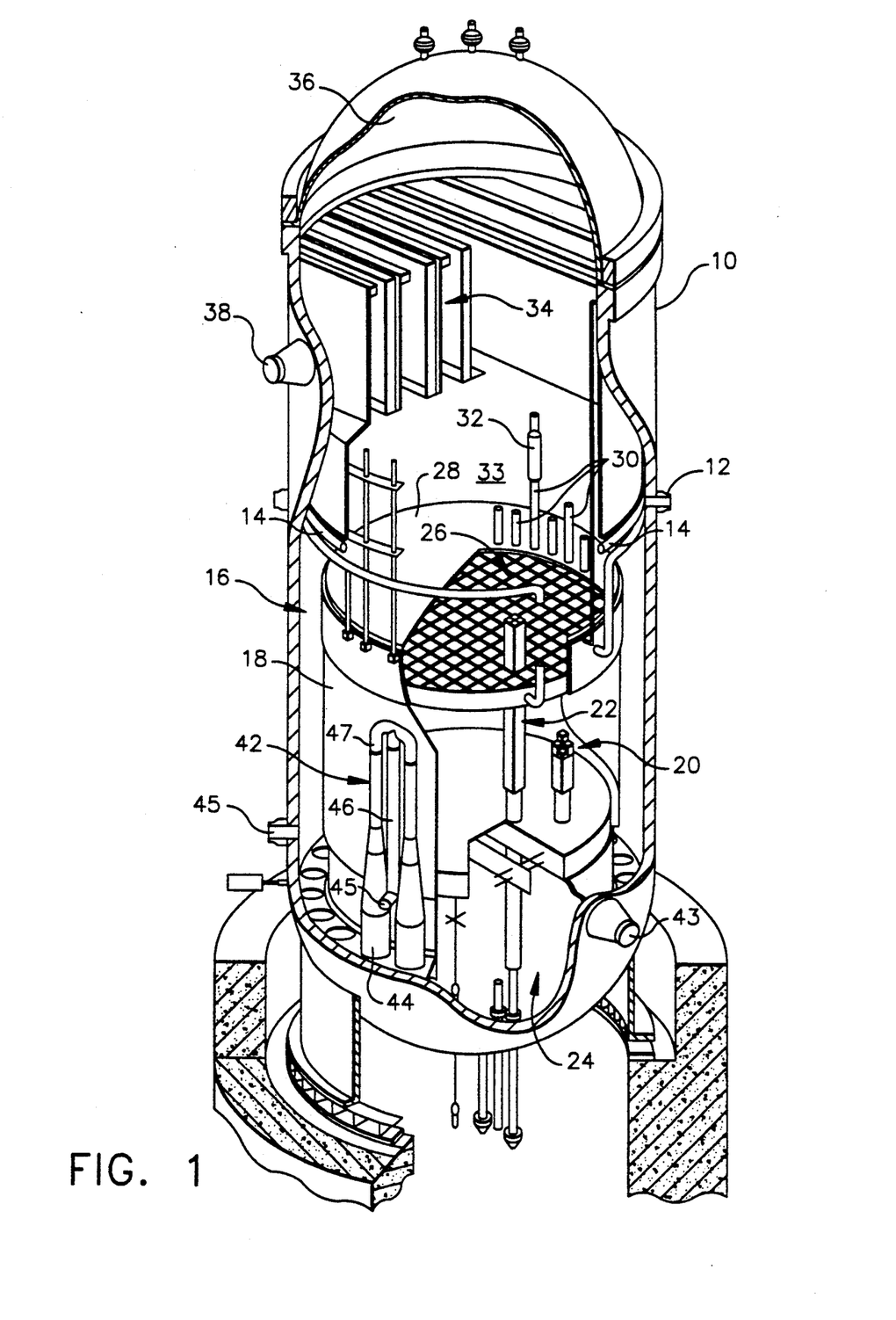
FIG. 1 is a schematic showing a partially cutaway perspective view of a conventional BWR.

The fluid flow in a boiling water reactor will be generally described with reference to FIG. 1. Feedwater is admitted into reactor pressure vessel (RPV) 10 via an inlet 12. Inlet 12 is connected to feedwater sparger 14, which is a ring-shaped pipe having suitable apertures through which the feedwater is distributed inside the RPV.

The feedwater from sparger 14 flows downwardly through the downcomer annulus 16, which is an annular region between the RPV and core shroud 18. Core shroud 18 is a stainless steel cylinder which surrounds the core 20 (only one fuel assembly 22 of which is depicted in FIG. 1) and separates the upward flow of coolant through the core from the downward flow in downcomer annulus 16.

The water flowing through downcomer annulus 16 then flows to the core lower plenum 24. The water subsequently enters the fuel assemblies 22 disposed within core 20, wherein a boiling boundary layer (not shown) is established, thus causing a lower non-boiling region and an upper boiling region within the fuel assemblies.

Next, a mixture of water and steam enters core upper plenum 26 which is formed within shroud head 28 and disposed atop core 20. Core upper plenum 26 provides stand-off between the steam-water mixture exiting core 20 and entering vertical standpipes 30, the latter being disposed atop shroud head 28 and in fluid communication with core upper plenum 26.

Each standpipe 30 is in fluid communication with a steam separator 32 mounted thereon. The steam-water mixture flowing through standpipes 30 enters steam separators 32, which are of the axial-flow centrifugal type. These separators separate the liquid water from the steam by employing a swirling motion to drive the water droplets to the outer wall of the separator. The separated liquid water then mixes with feedwater in the mixing plenum 33, which mixture then flows to the core via the downcomer annulus. The liquid water elevation or level established within the RPV during normal operation of the BWR is designated by numeral 50 in FIG. 4. The steam passes through steam dryers 34 and enters steam dome 36. The steam is withdrawn from the RPV via steam outlet 38.

The BWR also includes a coolant recirculation system which provides the forced convection flow through the core necessary to achieve the required power density. In some, but not all BWRs, a portion of the water is sucked from the lower end of the downcomer annulus 16 via outlet 45 and forced by a centrifugal recirculation pump 40 (see FIG. 4) into jet pump assemblies 42 via inlets 43. This type of BWR also has two recirculation pumps, each of which provides the driving flow for a plurality of jet pump assemblies. As best seen in FIG. 1, the pressurized driving water is supplied to a jet pump nozzle 44 by an inlet riser 46 via elbow 48.

Water radiolysis in the BWR core produces $H_2$, $O_2$ and $H_2O_2$. The $H_2O_2$ produced in the core is generally nonvolatile. Therefore, the $H_2$ and $O_2$ partition in the steam separators to go into the steam, while the $H_2O_2$ stays in the water phase and recirculates through the BWR. The decomposer of the invention decomposes $H_2O_2$ from the water/steam mixture exiting the core before it enters the steam separators. The resulting volatile gases, $H_2$ and $O_2$, will pass out of the reactor with the steam.

The resulting reactor water entering the vessel downcomer annulus will be very low in $H_2O_2$ as compared to the level when a decomposer is not used. The net effect of this reduction in the $H_2O_2$ concentration will be a decrease in the amount of hydrogen which must be added to the feedwater to establish the low levels of ($O_2+H_2O_2$) which result in corrosion potentials below the critical potential and thus protect against SCC.

Figure 3:
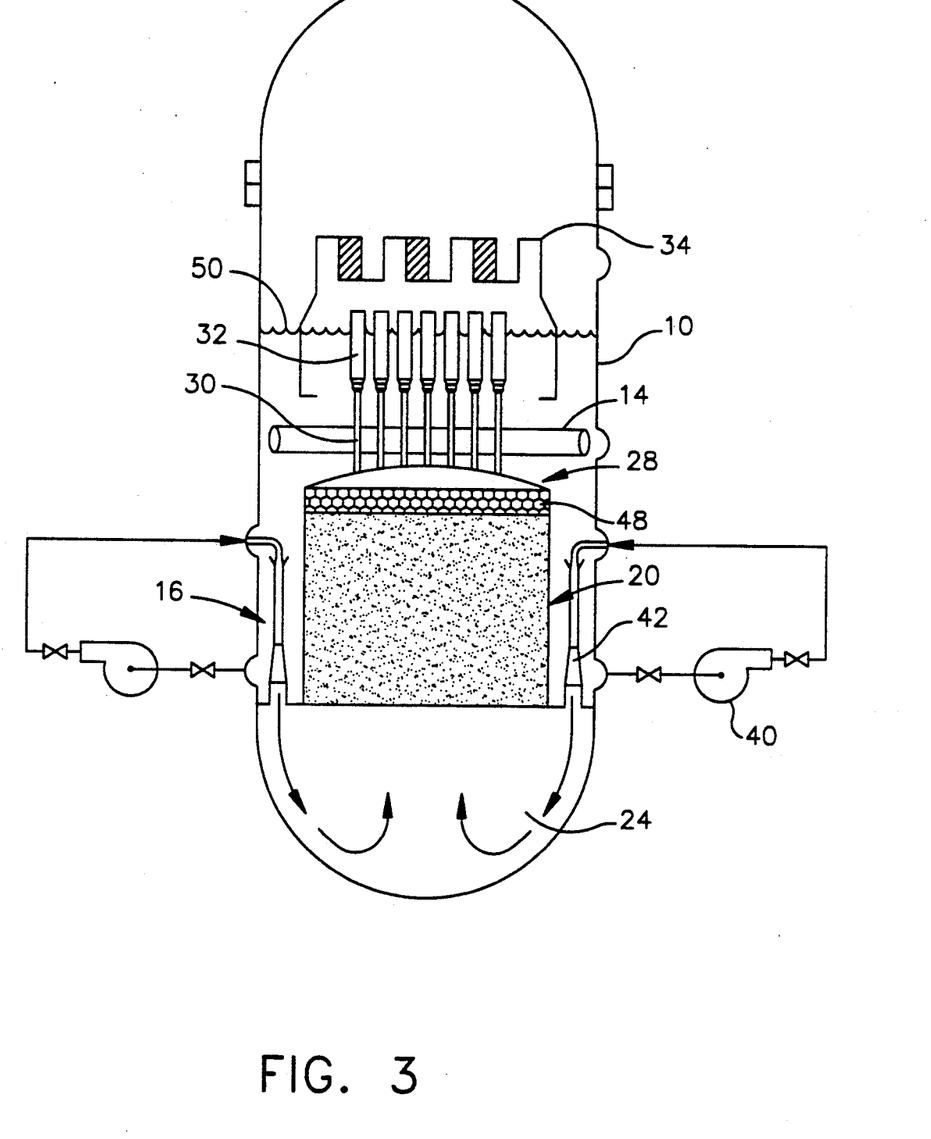
FIG. 3 is a schematic showing a decomposer installed in a BWR. in accordance with a preferred embodiment of the invention.

In accordance with a first preferred embodiment of the invention, the decomposer, generally designated by 48 in FIG. 3, has a generally planar configuration and is installed between the core outlet and the steam separator inlet. The decomposer is permanently attached to the shroud head 28, so that it is removed when the shroud head and steam separator assembly are removed. In accordance with a second preferred embodiment, the decomposer material, generally designated by 48' in FIG. 4, is installed inside the standpipes 30 of the steam separator assembly which extend vertically from shroud head 28.

One advantage of installation in the shroud head or in the standpipes is that the nonvolatile $H_2O_2$ is decomposed into volatile $H_2$ and $O_2$ which passes out of the reactor with the separated steam. Another advantage is that the decomposer of the invention is removed with the shroud head and steam separator assembly during refuelings. Thus, there would be no increase in refueling time associated with installation of a decomposer.

Figure 4:
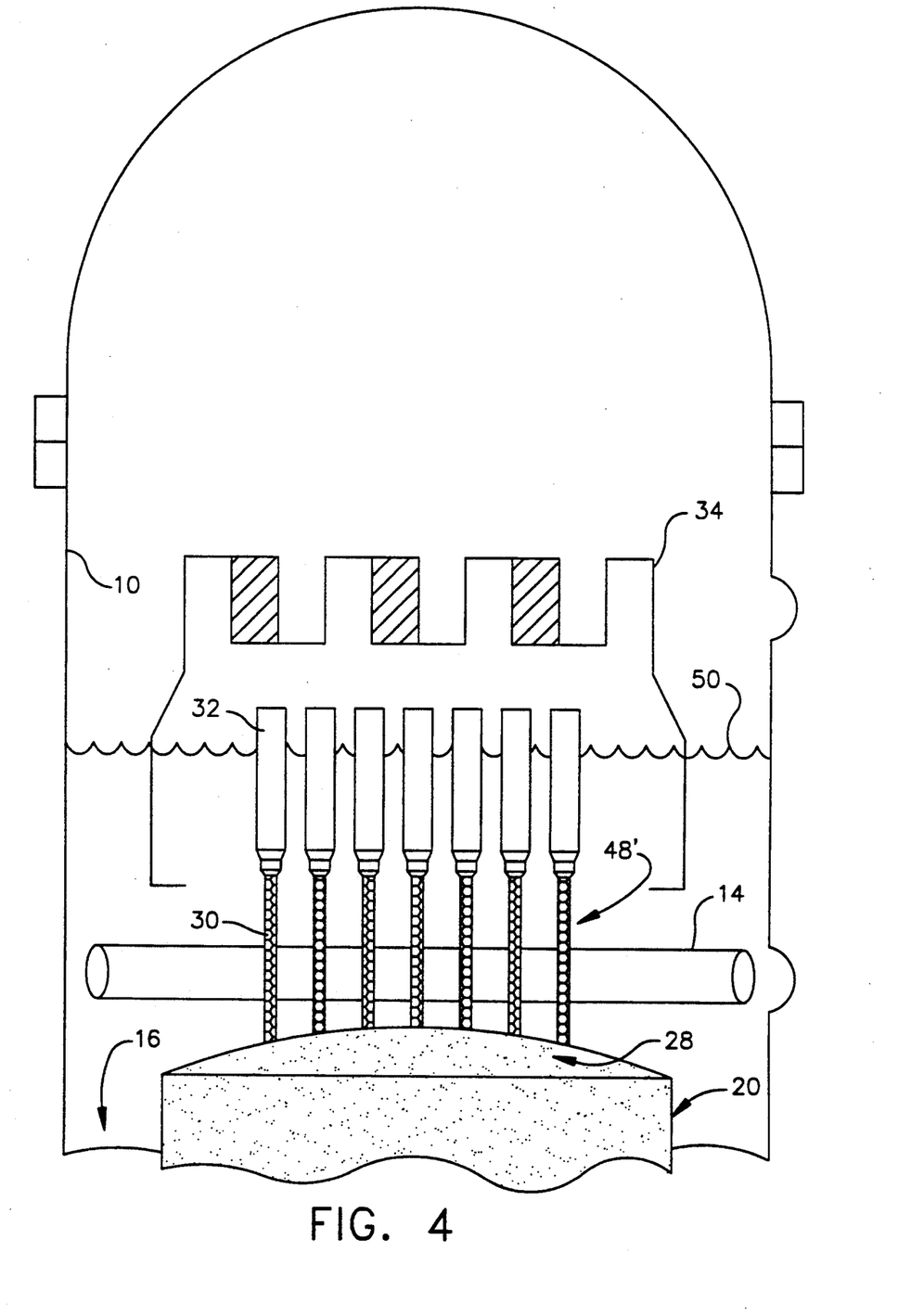
FIG. 4 is a schematic showing a decomposer installed in a BWR in accordance with another preferred embodiment of the invention.

FIGS. 3 and 4 respectively depict a cross section of the decomposer material. The honeycombed hatching is intended to symbolize an arrangement in which catalytic material having a high surface area is packed inside a volume and held in place by a stiffened metal mesh through which the water/steam mixture exiting the core flows. The catalytic decomposer material packed inside the shroud head or standpipes should have a high surface area-to-volume ratio and could take the form of tangled wire or foil strips, crimped ribbon, porous sintered metal composite, a honeycombed structure or any other structure having a high surface area-to-volume ratio. Other geometries would be suitable.

The catalytic material should be at least 6 inches thick in the direction of coolant flow. The typical residence time for water passing through the decomposer will be a few seconds or less. Upon passage of the water/steam mixture through the catalytic decomposer of the invention, hydrogen peroxide in the mixture is decomposed.

The preferred catalytic decomposer material is stainless steel because of its predictable performance in a BWR environment. To enhance the rate of hydrogen peroxide decomposition, the surface of the stainless steel substrate can be plated or alloyed with a noble metal, e.g., platinum or palladium. Other solid materials having a surface which causes heterogeneous decomposition of hydrogen peroxide and having structural strength and corrosion resistance suitable for the BWR environment can be used. The key requirement of the catalytic decomposer material is that it must perform at the reactor operating temperature of the water/steam mixture exiting the core.

In accordance with a preferred example, each piece of decomposer material may be a strip 0.012 inch thick by 12.0 inches long. The minimum thickness of any component currently used in the RPV is 0.012 inch as part of the fuel spacers. Therefore this thickness was chosen from the decomposer strips. The concern for small thicknesses is that pieces could break off and become lodged in the fuel assemblies where they could cause local hot spots. The length of 12 inches was selected to prevent a piece from traversing the path from the control rod guide tube to the fuel rods.

The width requirements are more subjective. A reasonable width of 0.25 inch was selected based on fabrication concerns. A piece of this size can be formed into any required shape to facilitate packing.

Figure 5:
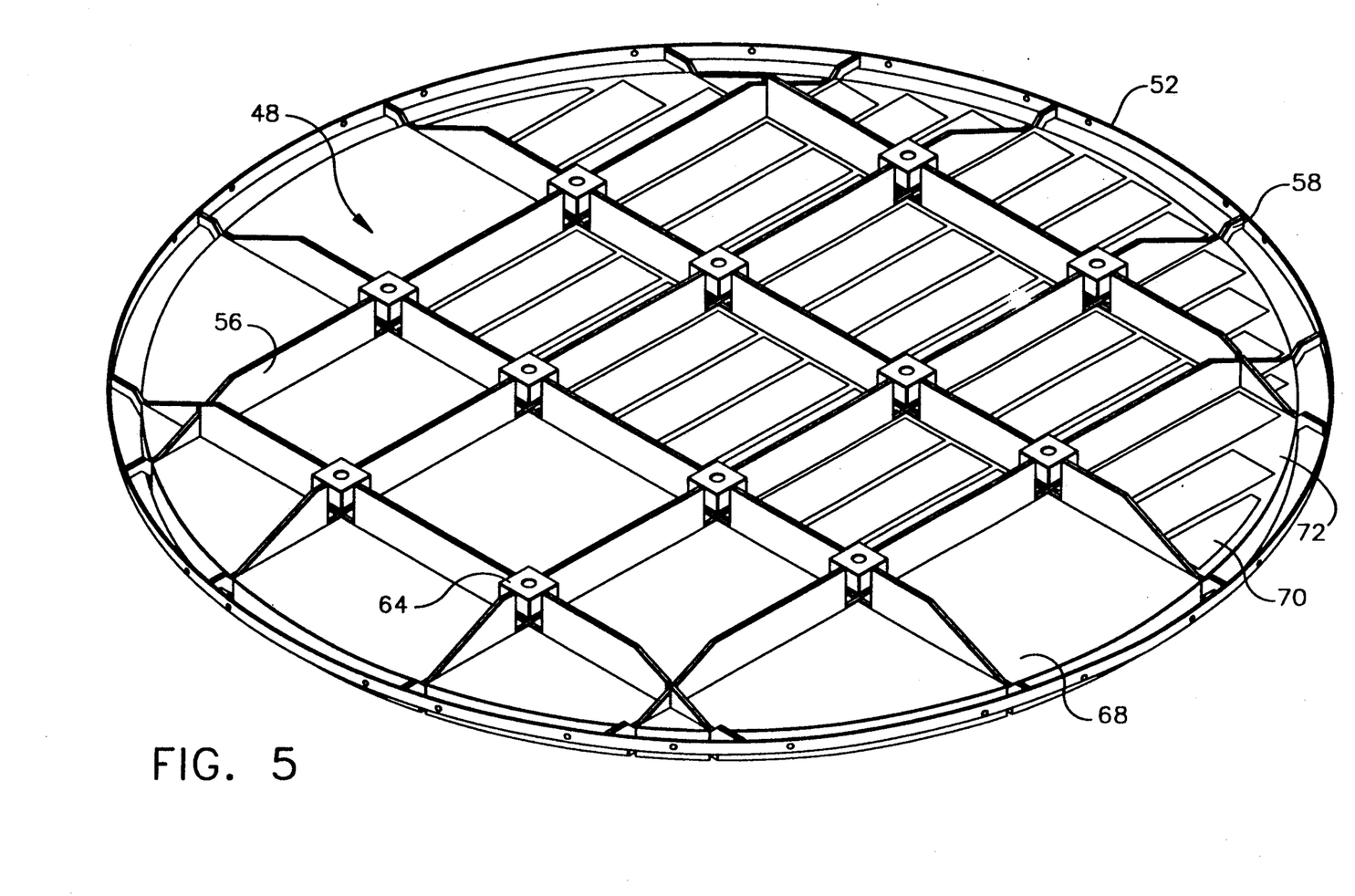
FIG. 5 is an isometric view showing in greater detail the decomposer installed in the shroud head in accordance with the preferred embodiment of FIG. 3.
Figure 6:
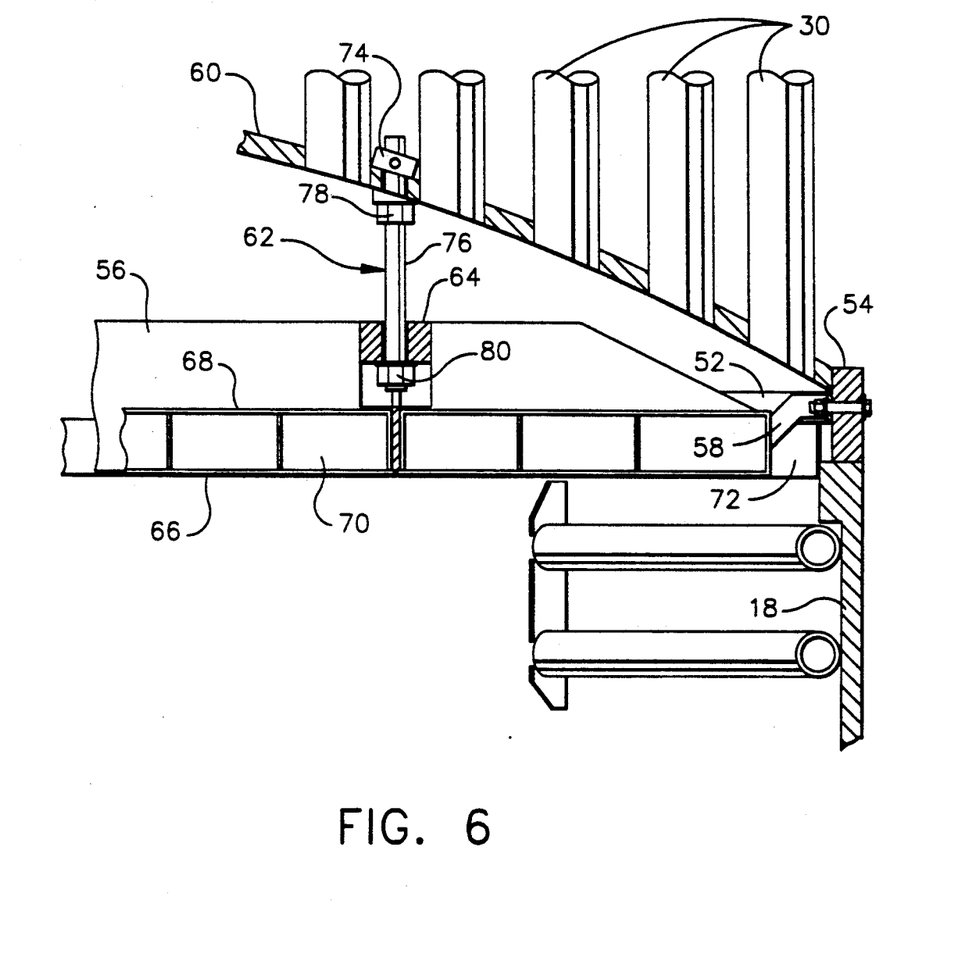
FIG. 6 is a sectional view of a portion of the decomposer shown in FIG. 5.

A specific design for a decomposer installed inside the shroud head is shown in FIGS. 5 and 6. The residence time for water passing through this decomposer will be approximately 0.2 sec. The pressure drop across the decomposer will be about 1 psi. The structure of the decomposer of the invention must be designed to withstand vibrations induced by the two-phase flow exiting the core.

The total weight of the decomposer will be approximately 25,000 pounds. The weight of a 251-inch RPV shroud head assembly is approximately 125,000 pounds. The weight of the decomposer was estimated by assuming that 90% of the decomposer volume would be open and 10% would be solid metal. Thus, the decomposer weighs approximately 50 pounds per cubic foot of decomposer volume plus the weight of the support structure.

Referring to FIGS. 5 and 6, the decomposer structure comprises a ring 52 which is bolted to the shroud head flange 54 and a grid of beams 56 supported by the ring. At the beam intersections, beams 56 are welded to a plurality of blocks 64, each block having a square cross section and a cylindrical vertical bore therethrough. The beams are sized to tolerate the expected flow-induced vibration.

The beams are partly supported by the ring via brackets 58 welded to the beams and ring. The beams are further supported by the shroud head dome 60 via a group of specially designed bolts 62, each having a T-bar 74 rotatably mounted near one end of a threaded pin 76. After a plurality of holes are formed in the dome, the pin 76 and T-bar 74 of each bolt are aligned and inserted first through the bore in corresponding block 64 and then through the corresponding hole in the dome. Once on the other side of the dome, the T-bar 74 is rotated to block removal of the pin 76 and the pin is locked in place by tightening of nut 78. The lower threads of each bolt 62 cooperate with the threads of a corresponding nut 80. The force of nuts 80 bearing against the bottom surfaces of blocks 64 helps to support the decomposer structure.

The exemplary design depicted in FIG. 5 has eight beams and twelve specially designed bolts. However, the precise number of beams or bolts is not critical to the invention so long as the structural requirements are met.

The decomposer in accordance with the preferred embodiment further comprises a bottom perforated plate 66 which is welded to the lower edges (see FIG. 6) of beams 56. The bottom perforated plate and the grid of beams form an array of zones in which individual boxes packed with catalytic material can be placed. Each box has perforated walls. FIGS. 5 and 6 show an arrangement wherein three boxes 70 are placed in each zone. The boxes are welded to the bottom perforated plate 66. Then a plurality of top perforated plates 68 are welded to the top of the boxes, one plate per zone, and to the adjacent beams.

Each box 70 is a stainless steel flow-through housing packed with catalytic decomposer material, which could take the form of tangled wire or foil strips, crimped ribbon, porous sintered metal composite, a honeycombed structure or any other structure having a high surface area-to-volume ratio. The walls of the boxes have small holes which allow the water/steam mixture to flow through.

The boxes 70 differ in dimension and shape to the extent needed to conform the decomposer to the geometry of the shroud head dome 60. The flow path through the decomposer material is preferably at least 6 inches. There is a minimum of 2 inches of clearance between the decomposer and any part of the reactor assembly that is stationary. Therefore, the catalytic material of the decomposer will not overlie portions 72 of the cross-sectional area of the shroud head adjacent the shroud head flange 54, where the height of the dome is reduced. These areas 72 between ring 52 and the catalytic decomposer material must be blocked to prevent the flow from bypassing the decomposer, e.g., by non-perforated stainless steel plates. If the catalyst thickness is increased beyond 6 inches, the flow area is further reduced due to the need to maintain a minimal clearance between the decomposer and the shroud head dome.

The water/steam mixture exiting the core flows upwardly through the perforations in the bottom plate 66, through the catalytic material packed in the perforated boxes 70, through the perforations in the top plates 68, and then into the standpipes 30 of the steam separation assembly. As previously described, the box housing may take the form of a stiffened metal mesh with catalytic decomposer material packed inside the housing. Preferably, the catalytic decomposer material is in the form of tangled wire or strips or crimped ribbon made of stainless steel.

The specific embodiment shown in FIGS. 5 and 6 has been described in detail for the purpose of illustration only. Although it shows the decomposer suspended in the shroud head, a practitioner of ordinary skill in the art of nuclear reactor engineering will be able to design other methods for installing the decomposer. The geometry and location of the decomposer in accordance with the invention will depend on the specific design of the BWR in which the decomposer is to be installed. However, the decomposer for any given type of BWR must be designed to ensure that virtually all of the water/steam mixture entering the steam/water separator device flows over the surface of the catalytic decomposer material.

We claim:

1. In a nuclear reactor comprising a core of nuclear fuel elements, a downcomer annulus between a pressure vessel and said core, means for feeding feedwater into said pressure vessel, means for forcing said feedwater to flow through said core to cool said fuel elements, and means for separating steam and water phases in the mixture exiting said core, said water phase flowing from said steam/water separating means to said downcomer annulus, the improvement wherein catalytic hydrogen peroxide decomposition means are arranged upstream of said steam/water separating means and downstream of said fuel elements, said catalytic hydrogen peroxide decomposition means comprising catalytic material arranged in an open structure which allows water and steam phases to flow therethrough, said catalytic hydrogen peroxide decomposition means being disposed so that substantially all of the water/steam mixture entering said steam/water separating means flows therethrough, and said catalytic material having a surface area-to-volume ratio sufficiently high enough to ensure that substantially all of the water phase passing through said catalytic hydrogen peroxide decomposition means flows close enough to a surface of said catalytic material to enable said catalytic material to catalyze the decomposition of hydrogen peroxide molecules dissolved in said water phase entering said steam/water separating means into water and oxygen molecules.

2. The nuclear reactor as defined in claim 1, wherein said catalytic hydrogen peroxide decomposition means comprise containment means in which said catalytic material is packed, said containment means having openings which enable water and steam phases to flow through said containment means, but which are not of a size to allow escape of said catalytic material therefrom.

3. The nuclear reactor as defined in claim 2, wherein said catalytic hydrogen peroxide decomposition means has a generally planar structure.

4. The nuclear reactor as defined in claim 3, further comprising a core shroud and a shroud head, wherein said catalytic hydrogen peroxide decomposition means is mounted inside said shroud head between said fuel elements and said steam/water separating means.

5. The nuclear reactor as defined in claim 2, further comprising a core shroud, a shroud head and a plurality of standpipes connected to said shroud head, wherein said catalytic hydrogen peroxide decomposition means is installed in said standpipes.

6. The nuclear reactor as defined in claim 1, wherein said catalytic material comprises entangled wires or strips made from a solid material having a heterogeneous surface.

7. The nuclear reactor as defined in claim 1, wherein said catalytic material comprises crimped ribbon made from made from a solid material having a heterogeneous surface.

8. The nuclear reactor as defined in claim 1, wherein said catalytic material comprises a porous sintered composite material.

9. A nuclear reactor comprising a core of nuclear fuel elements, a downcomer annulus between a pressure vessel and said core, means for feeding feedwater into said pressure vessel, means for forcing said feedwater to flow through said core to cool said fuel elements, means for separating steam and water phases in the mixture exiting said core, said water phase flowing from said steam/water separating means to said downcomer annulus, and means for catalyzing the decomposition of hydrogen peroxide molecules dissolved in said water phase entering said steam/water separating means into hydrogen and oxygen molecules, wherein said means for catalyzing hydrogen peroxide decomposition are arranged upstream of said steam/water separating means and downstream of said fuel elements and comprise catalytic material arranged in an open structure which allows water and steam phases to flow therethrough, said means for catalyzing hydrogen peroxide decomposition being disposed so that substantially all of the water phase entering said steam/water separating means flows therethrough.

10. The nuclear reactor as defined in claim 9, wherein said means for catalyzing hydrogen peroxide decomposition comprise containment means in which said catalytic material is packed, said containment means having openings which enable water and steam phases to flow through said containment means, but which are not of a size to allow escape of said catalytic material therefrom.

11. The nuclear reactor as defined in claim 9, wherein said means for catalyzing hydrogen peroxide decomposition has a generally planar structure.

12. The nuclear reactor as defined in claim 11, further comprising a core shroud and a shroud head, wherein said means for catalyzing hydrogen peroxide decomposition is mounted inside said shroud head between said fuel elements and said steam/water separating means.

13. The nuclear reactor as defined in claim 11, further comprising a core shroud, a shroud head and a plurality of standpipes connected to said shroud head, wherein said means for catalyzing hydrogen peroxide decomposition is installed in said standpipes.

14. The nuclear reactor as defined in claim 10, wherein said catalytic material comprises tangled or crimped solid material having a heterogeneous surface.

* * * * *